US012215008B2

(12) United States Patent
Thomas et al.

(10) Patent No.: US 12,215,008 B2
(45) Date of Patent: Feb. 4, 2025

(54) MOTOR LIFTING DEVICES AND METHODS FOR OPERATING THE SAME

(71) Applicant: Saudi Arabian Oil Company, Dhahran (SA)

(72) Inventors: Nishan Xavier Chammany Thomas, Eastern Province (SA); Abdulmunem H. Taisan, Eastern Province (SA); Abdullah G. Alotaibi, Riyadh Province (SA)

(73) Assignee: Saudi Arabian Oil Company, Dhahran (SA)

( * ) Notice: Subject to any disclaimer, the term of this patent is extended or adjusted under 35 U.S.C. 154(b) by 1097 days.

(21) Appl. No.: 17/112,224

(22) Filed: Dec. 4, 2020

(65) Prior Publication Data

US 2022/0177285 A1 Jun. 9, 2022

(51) Int. Cl.
*B66F 7/28* (2006.01)
*B66F 7/00* (2006.01)
*F28F 99/00* (2006.01)

(52) U.S. Cl.
CPC .................. *B66F 7/28* (2013.01); *B66F 7/00* (2013.01); *F28F 99/00* (2013.01); *F28F 2280/00* (2013.01)

(58) Field of Classification Search
CPC .... B66F 7/28; B66F 7/00; B66F 9/075; B66F 9/122; B66F 9/18; F28F 99/00; F28F 2280/00; F04D 29/601
See application file for complete search history.

(56) References Cited

U.S. PATENT DOCUMENTS

| | | | |
|---|---|---|---|
| 834,270 | A | 10/1906 | Dale |
| 2,798,757 | A | 7/1957 | Jackson |
| 4,588,165 | A | 5/1986 | Stellato et al. |
| 4,762,355 | A | 8/1988 | Hogg |
| 4,763,761 | A | 8/1988 | McKinsey et al. |
| 5,383,652 | A | 1/1995 | Van Den Berg |
| 5,800,000 | A | 9/1998 | Shockley |

(Continued)

FOREIGN PATENT DOCUMENTS

| | | | | |
|---|---|---|---|---|
| CN | 111285292 A | | 6/2020 | |
| WO | WO-2014046541 A1 | * | 3/2014 | ............ B66F 11/042 |

OTHER PUBLICATIONS

Peinemann Equipment, "Motor Lifter Removing Electrical Motor", YouTube Video, https://www.youtube.com/watch?v=mNFVdEGLSWg, Nov. 14, 2014, accessed Aug. 20, 2020.

(Continued)

*Primary Examiner* — Lee A Holly
(74) *Attorney, Agent, or Firm* — Dinsmore & Shohl LLP

(57) ABSTRACT

A method for removing a fin fan motor from a heat exchanger includes positioning a motor lifting device beneath the fin fan motor, moving a carriage of the motor lifting device upward in a vertical direction with respect to a base member of the motor lifting device along a vertical guide column, moving one or more vertical support members into a locked position, the one or more vertical support members spaced apart from the vertical guide column and extending between the carriage and the base member, where the one or more vertical support members restrict vertical movement of the carriage with respect to the base member in the locked position, and moving the fin fan motor to the carriage of the motor lifting device.

7 Claims, 3 Drawing Sheets

(56) References Cited

U.S. PATENT DOCUMENTS

| | | | |
|---|---|---|---|
| 6,991,064 | B2 | 1/2006 | Ehrenleitner |
| 2010/0155566 | A1 | 6/2010 | Linz |
| 2015/0246799 | A1 | 9/2015 | Mizelmoe |

OTHER PUBLICATIONS

International Search Report and Written Opinion dated Aug. 31, 2021 pertaining to International application No. PCT/US2021/018669 filed Feb. 19, 2021, 14 pages.

* cited by examiner

MOTOR LIFTING DEVICES AND METHODS FOR OPERATING THE SAME

BACKGROUND

Field

The present disclosure relates to motor lifting devices and methods for operating the same.

Technical Background

Heat exchangers, such as fin fan heat exchangers, may generally exchange heat by passing air over a series of coils and may include fans that induce airflow upward in the vertical direction over the coils. The fans are generally driven by a motor, and the motor and fans are generally positioned at an elevated position (e.g., overhead) such that air can flow from an underside of the fans, upward toward the series of coils.

BRIEF SUMMARY

Periodically, the fans and/or the motors may need to be maintained. For example, the motors may be periodically removed from the heat exchanger for servicing. Because the motors are generally positioned at elevated positions (e.g., overhead positions), it may be difficult to remove and replace the motors from the heat exchangers. For example, the motors may be heavy, and may need to be supported by a hoist or crane when being removed from the fin fan heat exchangers.

Accordingly, a need exists for alternative devices and methods for removing and installing motors to heat exchangers. Embodiments of the present disclosure are generally directed to motor lifting devices including a base member, a vertical guide column, and a carriage that can be utilized to install motors and to remove motors from a heat exchanger.

In one embodiment, a method for removing a fin fan motor from a heat exchanger includes positioning a motor lifting device beneath the fin fan motor, moving a carriage of the motor lifting device upward in a vertical direction with respect to a base member of the motor lifting device along a vertical guide column, moving one or more vertical support members into a locked position, the one or more vertical support members spaced apart from the vertical guide column and extending between the carriage and the base member, where the one or more vertical support members restrict vertical movement of the carriage with respect to the base member in the locked position, and moving the fin fan motor to the carriage of the motor lifting device.

In another embodiment, a motor lifting device includes a base member, a vertical guide column coupled and extending upward from the base member in a vertical direction, a carriage coupled to the vertical guide column, the carriage including a carriage base engaged with and movable along the vertical guide column, and a carriage plate defining one or more slots configured to receive a motor shaft, and one or more transverse actuators structurally configured to move the carriage plate in a direction transverse to the vertical direction with respect to the vertical guide column.

In yet another embodiment, a motor lifting device includes a base member, a vertical guide column coupled to the base member, a carriage engaged with the vertical guide column, the carriage defining one or more slots configured to receive a motor shaft, and one or more vertical support members spaced apart from the vertical guide column and extending between the carriage and the base member, where the one or more vertical support members are positionable between an unlocked position, in which vertical movement of the carriage with respect to the base member is permitted, and a locked position, in which the one or more vertical support members restrict vertical movement of the carriage with respect to the base member.

Additional features and advantages of the technology disclosed in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Embodiments of the present disclosure are directed to motor lifting devices including a base member, a vertical guide column, and a carriage that can be utilized to install motors and to remove motors from a heat exchanger. These and other embodiments will now be described with reference to the appended drawings.

As referred to herein, the term "longitudinal direction" refers to a forward-rearward direction of the motor lifting devices described herein (e.g., the +/−y-direction as depicted in the figures). As referred to herein, the term "lateral direction" refers to a cross-wise direction of the motor lifting devices described herein and is transverse to longitudinal direction (e.g., the +/−x-direction as depicted in the figures). As referred to herein, the term "vertical direction" refers to the upward-downward direction of the motor lift devices described herein, and is transverse to the longitudinal and lateral directions (e.g., the +/−z-direction as depicted in the figures).

Figure 1:
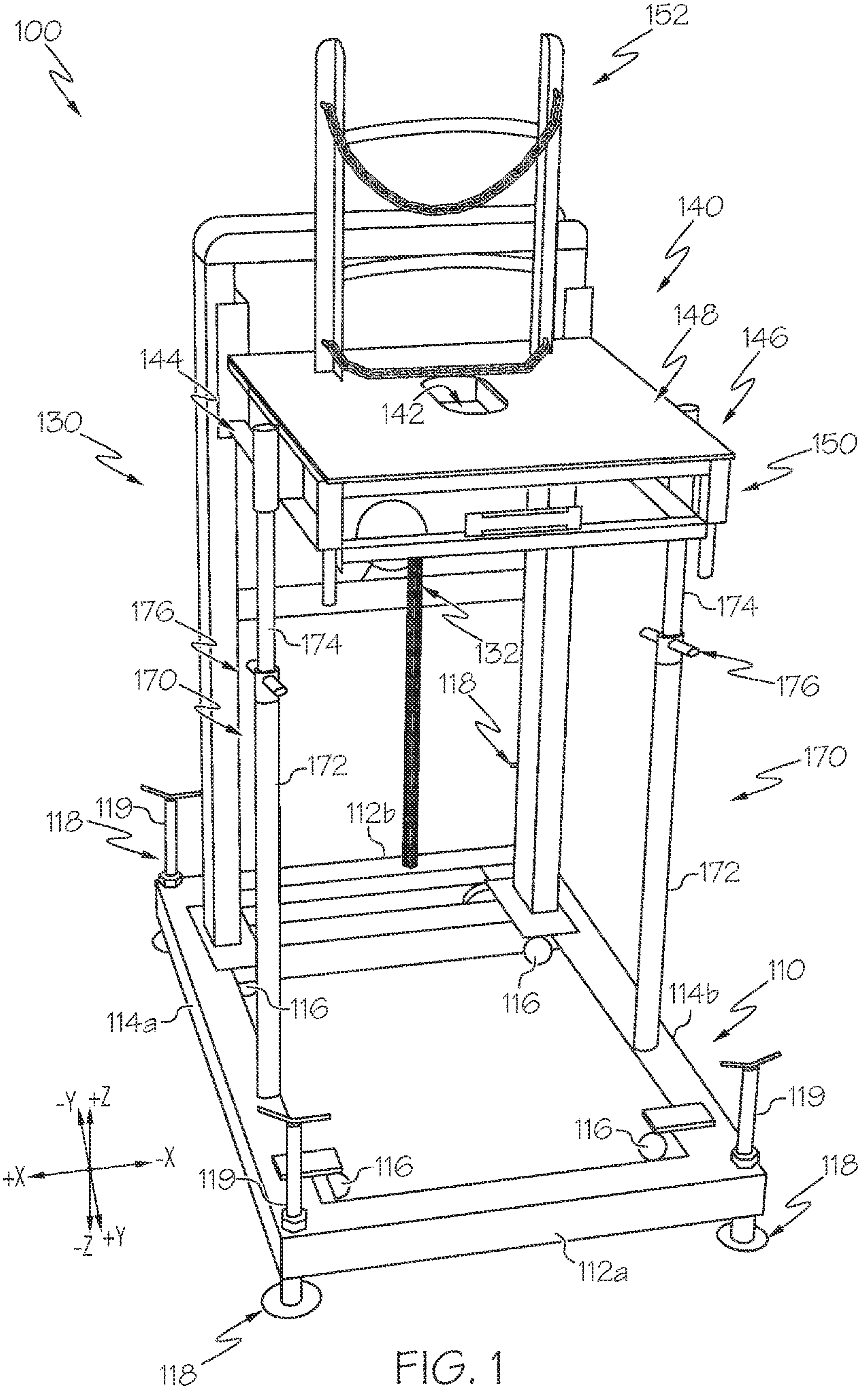
FIG. 1 schematically depicts a perspective view of a motor lifting device, according to one or more embodiments shown and described herein.

Now referring to FIG. 1, perspective views of an example motor lifting device 100 are schematically depicted. The motor lifting device 100 may be utilized to engage and support motors, such as may be utilized in a fin fan heat exchanger. Fin fan heat exchangers may generally exchange heat by passing air over a series of coils and may include fans that induce airflow upward in the vertical direction over the coils. The fans are generally driven by a motor, and the motor and fans are generally positioned at an elevated position (e.g., overhead) such that air can flow from an underside of the fans, upward toward the series of coils. Periodically, the fans and/or the motors may need to be maintained. For example, the motors may be periodically removed from the fin fan heat exchanger for servicing. Because the motors are generally positioned at elevated positions (e.g., overhead positions), it may be difficult to remove and replace the motors from the fin fan heat exchangers. For example, the motors may be heavy, and may need to be supported when being removed from the fin fan heat exchangers.

As shown in FIG. 1, the motor lifting device 100 generally includes a base member 110, a vertical guide column 130, and a carriage 140. In some embodiments, the base member 110, the vertical guide column 130, and the carriage 140 may be removable from one another such that the components can be packed and stored when not in use.

In the embodiment depicted in FIG. 1, the base member 110 includes opposing lateral base members **112*a*, 112*b* extending in the lateral direction (i.e., in the +/−x-direction as depicted) and opposing longitudinal base members 114*a*, 114*b* extending in the longitudinal direction (i.e., in the +/−y-direction as depicted). The opposing lateral base members 112*a*, 112*b* are spaced apart from one another in the longitudinal direction (i.e., in the +/−y-direction as depicted) and the opposing longitudinal base members 114*a*, 114*b* are spaced apart from one another in the lateral direction (i.e., in the +/−x-direction as depicted). While in the embodiment depicted in FIG. 1 the base member 110 includes the opposing lateral base members 112*a*, 112*b* and the opposing longitudinal base members 114*a*, 114*b*, it should be understood that this is merely an example, and the base member 110 may include any suitable structure to support the components of the motor lifting device 100. For example, in some embodiments, the base member 110 may include single-piece construction extending in the longitudinal and the lateral directions (i.e., in the +/−y-direction and the +/−x-direction as depicted). Further, while the base member 110 is depicted as having a generally rectangular shape, it should be understood that this is merely an example, and the base member 110 may have any suitable shape to support the components of the motor lifting device 100**.

One or more wheels 116, in some embodiments, are coupled to the base member 110. The one or more wheels 116 are rotatable with respect to the base member 110 and may allow the motor lifting device 100 to move in the longitudinal and lateral directions (i.e., in the +/−y-direction and the +/−x-direction as depicted) along a surface. By moving along a surface, the motor lifting device 100 can be positioned below a motor (or motor mount) of a fin fan heat exchanger to remove (or install) the motor. While in the embodiment shown in FIG. 1 the motor lifting device 100 includes four wheels 116 positioned at opposing corners of the base member 110, it should be understood that motor lifting devices 100 according to the present disclosure may include any suitable number of wheels 116 positioned at any suitable locations of the base member 110.

In some embodiments, the motor lifting device 100 includes one or more outrigger members 118. The one or more outrigger members 118, in some embodiments, may include a threaded outrigger rod 119 that is movable with respect to the base member 110 of the motor lifting device 100 in the vertical direction (i.e., in the +/−z-direction as depicted). In embodiments, a user may move the threaded outrigger rods 119 in the vertical direction (i.e., in the +/−z-direction as depicted) by rotating the threaded outrigger rods 119 with respect to the base member 110.

In some embodiments, the one or more outrigger members 118 are movable between an extended position and a retracted position. In the extended position, the one or more outrigger members 118 extend below the wheels 116 in the vertical direction (i.e., in the −z-direction as depicted). With the one or more outrigger members 118 positioned below the wheels 116, the motor lifting device 100 may be supported on a surface via the one or more outrigger members 118, and the wheels 116 may be spaced apart from the surface. In the retracted position, the one or more outrigger members 118 are positioned above the wheels 116 in the vertical direction (i.e., in the +z-direction as depicted). With the outrigger members 118 positioned above the wheels 116, the motor lifting device 100 may be supported on the surface via the wheels 116 and the outrigger members 118 are spaced apart from the surface. Accordingly, with the outrigger members 118 in the retracted position, the motor lifting device 100 may be moved along the surface via the wheels 116.

In some embodiments, the one or more outrigger members 118 may be utilized to level the motor lifting device 100 on uneven surfaces. For example, in embodiments, the one or more outrigger members 118 are movable in the vertical direction (i.e., in the +/−z-direction as depicted) independently from one another. Accordingly, each of the one or more outrigger members 118 may be positioned at different heights in the vertical direction (i.e., in the +/−z-direction as depicted) such that the motor lifting device 100 may be level (e.g., in a plane defined by the lateral and longitudinal directions) even when the motor lifting device 100 is positioned on an uneven surface. By assisting in ensuring the motor lifting device 100 is level (e.g., in the plane defined by the lateral and longitudinal directions), the one or more outrigger members 118 may assist in positioning the motor lifting device 100 to receive or install a fin fan motor, as described in greater detail herein.

The vertical guide column 130, in embodiments, extends upward from the base member 110 in the vertical direction (i.e., in the +z-direction as depicted). The carriage 140 extends outward from the vertical guide column 130. For example, in the embodiment depicted in FIG. 1, the carriage 140 extends forward of the vertical guide column 130 in the longitudinal direction (i.e., in the +y-direction as depicted). In embodiments, the carriage 140 is movable in the vertical direction (i.e., in the +z-direction as depicted) along the vertical guide column 130.

For example, in some embodiments, the motor lifting device 100 includes a vertical actuator 132 coupled to the carriage 140. The vertical actuator 132, in embodiments, is operable to move the carriage 140 in the vertical direction (i.e., in the +/−z-direction as depicted) along the vertical guide column 130. While in the embodiment depicted in FIG. 1 the vertical actuator 132 is depicted as including a chain block lifter, it should be understood that this is merely an example. For example, motor lifting devices 100 according to the present disclosure may include any suitable actuator to move the carriage 140 in the vertical direction (i.e., in the +/−z-direction as depicted) along the vertical guide column 130.

In some embodiments, the vertical actuator 132 may selectively restrict movement of the carriage 140 in the vertical direction (i.e., in the +/−z-direction as depicted). For example, in embodiments in which the vertical actuator 132 includes a chain block lifter, the vertical actuator 132 may include one or more ratchets that selectively restrict movement of the carriage 140 in the vertical direction (i.e., in the +/−z-direction as depicted) along the vertical guide column 130. By selectively restricting movement of the carriage 140 along the vertical guide column 130, the vertical actuator 132 may support a fin fan motor positioned on the carriage 140 in the vertical direction (i.e., in the +/−z-direction as depicted).

In some embodiments, the motor lifting device 100 includes one or more vertical support members 170. The one or more vertical support members 170, in the embodiment depicted in FIG. 1, are spaced apart from the vertical guide column 130 and extend between the carriage 140 and the base member 110. In embodiments, the one or more vertical support members 170 are positionable between an unlocked position and a locked position. In the unlocked position, vertical movement of the carriage 140 with respect to the base member 110 is permitted. In the locked position, the one or more vertical support members 170 restrict vertical movement of the carriage 140 with respect to the base member 110.

In the embodiment depicted in FIG. 1, the motor lifting device 100 includes two vertical support members 170. For example and as shown in FIG. 1, the motor lifting device 100 includes a first vertical support member 170 engaged with a first side 144 of the carriage 140 and a second vertical support member 170 engaged with a second side 146 of the carriage 140. In the embodiment depicted in FIG. 1, the first side 144 of the carriage 140 is opposite the second side 146 of the carriage 140 in the lateral direction (i.e., in the +/−x-direction as depicted). By supporting the opposite sides of the carriage 140, moments acting on the carriage 140 (i.e., about the longitudinal direction) can be reduced. However, it should be understood that embodiments according to the present disclosure may include any suitable number of vertical support members 170 spaced apart from the vertical guide column 130.

In embodiments, the one or more vertical support members 170 may assist in supporting the weight of a fin fan motor positioned on the carriage 140. For example, in the embodiment depicted in FIG. 1, the carriage 140 is a cantilever extending in the longitudinal direction (i.e., in the +y-direction as depicted) from the vertical guide column 130. When a motor is positioned on the carriage 140, the fin fan motor may apply a moment to the vertical guide column 130. Because the one or more vertical support members 170 are spaced apart from the vertical guide column 130 in the longitudinal direction (i.e., in the +y-direction as depicted), the one or more vertical support members 170 may support the carriage 140 (and a motor positioned on the carriage 140), thereby reducing the moment acting on the vertical guide column 130. In embodiments according to the present disclosure, the one or more vertical support members 170 and/or the vertical actuator 132 may allow the carriage 140 to support a motor of at least 500 kilograms.

In embodiments, the one or more vertical support members 170 include one more support columns 172 coupled to the base member 110. In some embodiments, one or more screws 174 may be positioned at least partially within the one or more support columns 172, and one or more lock nuts 176 may be engaged with the one or more screws 174. Through the one or more lock nuts 176, the one or more screws 174 may be moved with respect to the one or more support columns 172 in the vertical direction (i.e., in the +/−z-direction as depicted) as the carriage 140 moves in the vertical direction such that the one or more vertical support members 170 remain engaged with the carriage 140.

Figure 2A:
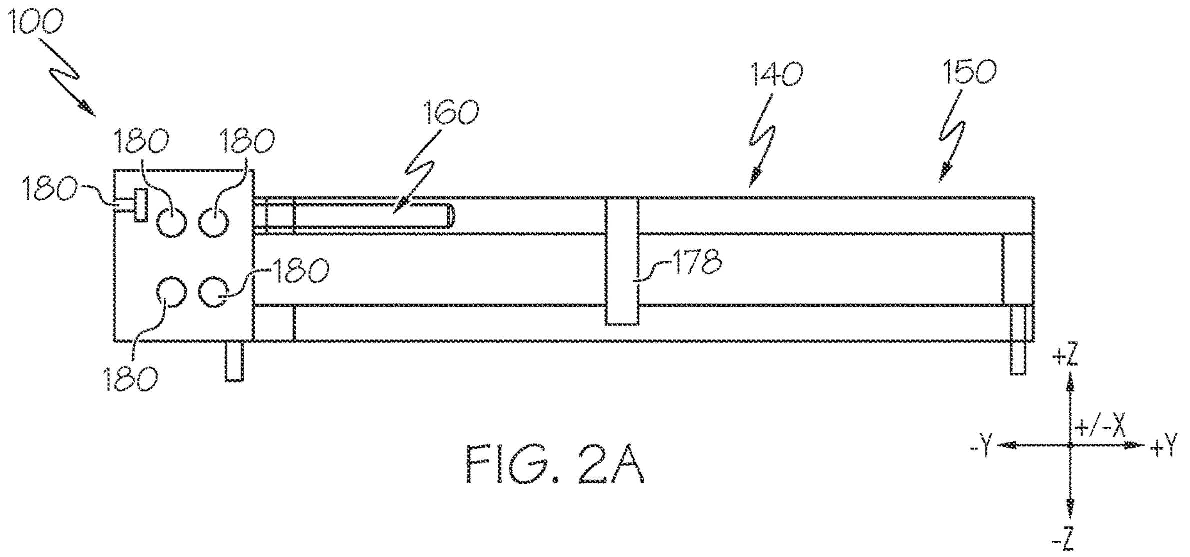
FIG. 2A schematically depicts a side view of a carriage base of the motor lifting device of FIG. 1, according to one or more embodiments shown and described herein.
Figure 2B:
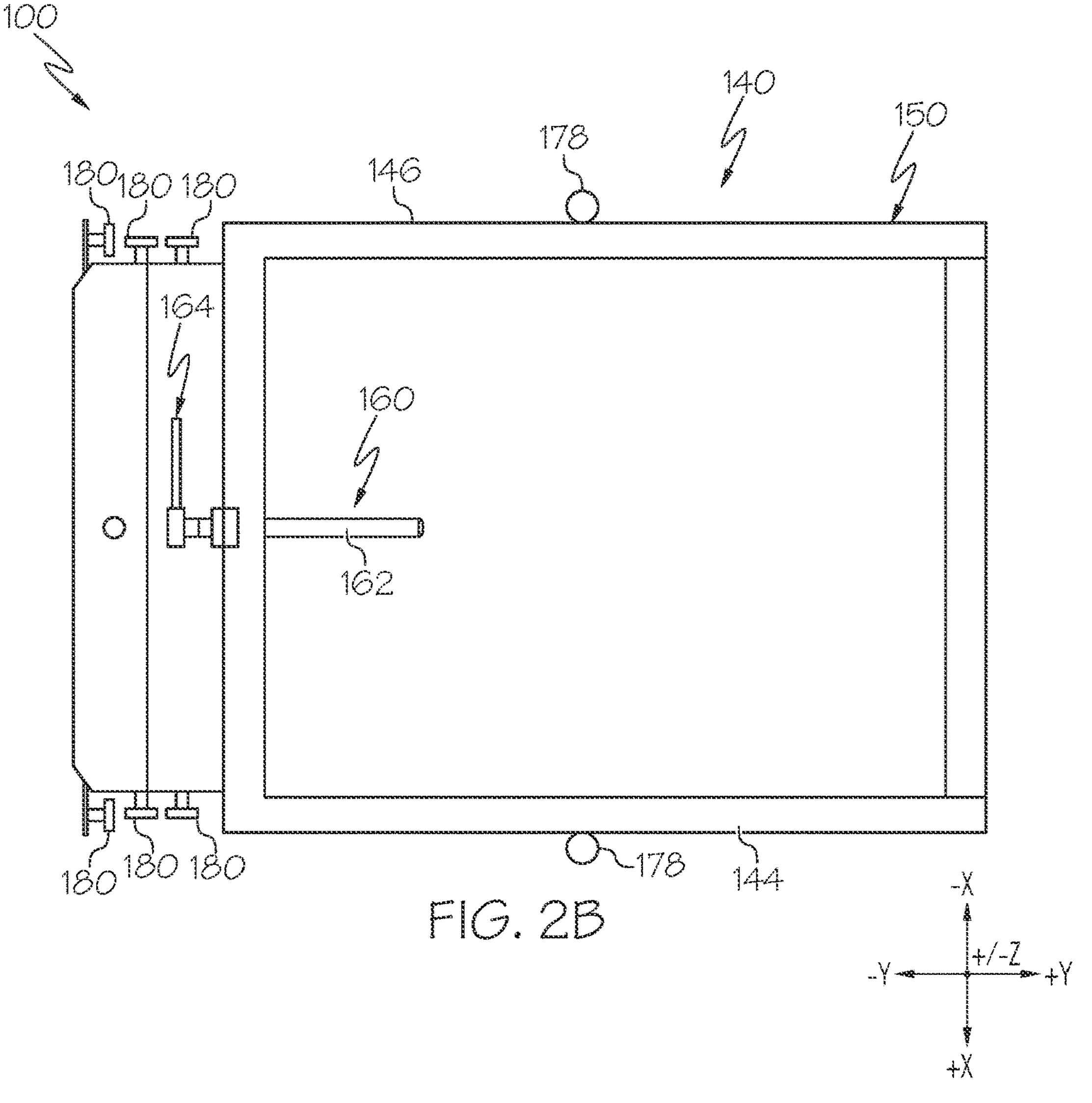
FIG. 2B schematically depicts a top view of the carriage base of FIG. 2A, according to one or more embodiments shown and described herein.
Figure 3:
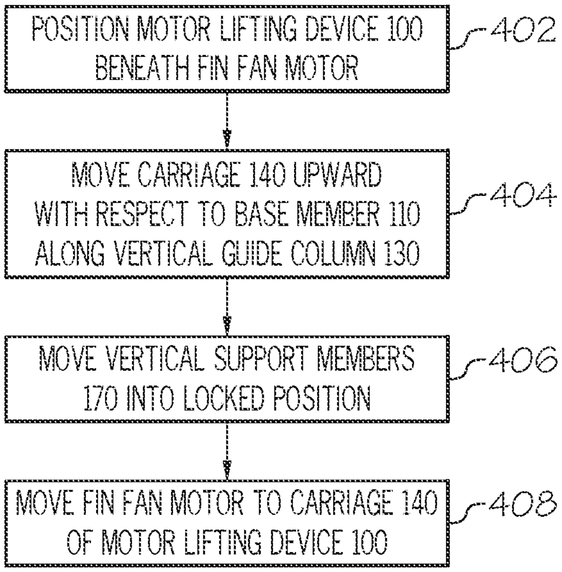
FIG. 3 depicts a flowchart of a method for removing a motor from a heat exchanger with the motor lifting device of FIG. 1, according to one or more embodiments shown and described herein.

Referring to FIGS. 1, 2A, and 2B, in some embodiments, the carriage 140 includes a carriage plate 148 and a carriage base 150. In embodiments, the carriage plate 148 may receive a fin fan motor. For example, in some embodiments, the carriage plate 148 defines one or more slots 142 extending through the carriage plate 148. The one or more slots 142 may receive a shaft of a fin fan motor positioned on the carriage 140, as described in greater detail herein.

In some embodiments, the motor lifting device 100 includes a holding frame 152 extending upward from the carriage plate 148. For example in the embodiment depicted in FIG. 1 the holding frame 152 extends upward from the carriage plate 148 in the vertical direction (i.e., in the +z-direction as depicted). The holding frame 152 may assist in supporting a fin fan motor positioned on the carriage 140. For example, in some embodiments, one or more fasteners, such as chains, ropes or the like, may be attached to the holding frame 152 and may be positioned around the fin fan motor positioned on the carriage plate 148, thereby restricting movement of the fin fan motor on the carriage plate 148.

In some embodiments, the motor lifting device 100 includes one or more transverse actuators 160 structurally configured to move the carriage plate 148 in a direction transverse to the vertical direction with respect to the vertical guide column 130. For example, in the embodiment depicted in FIGS. 2A and 2B, the one or more transverse actuators 160 are coupled to the carriage base 150 and include an actuator screw 162 and a handle 164 coupled to the actuator screw 162. In embodiments, the actuator screw 162 may rotate about the longitudinal direction (i.e., the +/−y-direction as depicted) by a user via the handle 164. The actuator screw 162 is engageable with and may be engaged with the carriage plate 148 such that the actuator screw 162 moves the carriage plate 148 in the longitudinal direction (i.e., in the +/−y-direction as depicted) as the actuator screw rotates 162. In this way, the carriage plate 148 is movable in the longitudinal direction with respect to the carriage base 150 and accordingly the vertical guide column 130. While in the embodiment depicted in FIGS. 2A and 2B the one or more transverse actuators 160 are depicted as including the actuator screw 162 engaged with the carriage plate 148, it should be understood that this is merely an example. In embodiments according to the present disclosure, the one or more transverse actuators 160 may include any suitable device to move the carriage plate 148 with respect to the carriage base 150 (and accordingly the vertical guide column 130). Further, while in the embodiment depicted in FIGS. 1-2A the one or more transverse actuators 160 are depicted as moving the carriage plate 148 in the longitudinal direction (i.e., in the +/−y-direction as depicted), it should be understood that this is merely an example. In embodiments according to the present disclosure, the one or more transverse actuators 160 may be operable to move the carriage plate 148 in the lateral direction (i.e., in the +/−x-direction as depicted) with respect to the carriage base 150.

By moving the carriage plate 148 via the one or more transverse actuators 160, the carriage plate 148 may be positioned beneath a motor (or a motor mount of a heat exchanger) without requiring movement of the base member 110 of the motor lifting device 100. In this way, the carriage plate 148 may be positioned beneath a motor (or a motor mount of a heat exchanger) with the outrigger members 118 in the engaged position. Further, the one or more transverse actuators 160 may generally allow more precise movement of the carriage plate 148 in the longitudinal and/or the lateral directions (i.e., in the +/−y-direction and/or the +/−x-direction) as compared to moving the base member 110 along a surface via the wheels 116.

In some embodiments, the carriage base 150 includes one or more bearings 180. The one or more bearings 180 may be engageable with and/or may be engaged with the vertical guide column 130, and the carriage base 150 may be movable along the vertical guide column 130 in the vertical direction (i.e., in the +/−z-direction as depicted) via the one or more bearings 180.

In some embodiments, the carriage base 150 includes one or more locking member engagement posts 178. The one or more locking member engagement posts 178 may receive the screws 174 of the one or more vertical support members 170, such that the screws 174 of the one or more vertical support members 170 support the carriage base 150 in the vertical direction (i.e., in the +/−z-direction as depicted).

Methods for utilizing the motor lifting device 100 to remove a motor from a heat exchanger, such as a fin fan heat exchanger, will now be described.

Referring to FIGS. 1-4, a flowchart for a method for using the motor lifting device 100 to remove a motor from a heat exchanger is depicted.

In a first block 402, the motor lifting device 100 is positioned beneath a fin fan motor. As described above, in some embodiments, the motor lifting device 100 includes the wheels 116 that allow the motor lifting device 100 to move along a surface such that the motor lifting device 100 may be positioned beneath a fin fan motor.

In some embodiments and as described above, to locate the carriage 140 beneath the motor, the carriage plate 148 may be moved in a direction transverse to the vertical direction (i.e., in the longitudinal and/or lateral directions) via the one or more transverse actuators 160.

In some embodiments, once the motor lifting device 100 is positioned beneath the fin fan motor, the one or more outrigger members 118 may be moved into the engaged position to fix the position of the motor lifting device 100. As described above, the one or more outrigger members 118 may also be utilized to level the motor lifting device 100.

In a second block 404, the carriage 140 of the motor lifting device 100 is moved upward in the vertical direction (i.e., in the +z-direction as depicted) with respect to the base member 110 of the motor lifting device 100 along the vertical guide column 130. As described above, the motor lifting device 100 may include a vertical actuator 132 that is operable to move the carriage 140 in the vertical direction (i.e., in the +/−z-direction as depicted). The carriage 140 may be moved upward in the vertical direction (i.e., in the +z-direction as depicted) to engage a fin fan motor.

In a third block 406, the one or more vertical support members 170 are moved into the locked position. As described above, the one or more vertical support members 170 may restrict vertical movement (i.e., movement in the +/−z-direction as depicted) of the carriage 140 with respect to the base member 110 in the locked position.

In a fourth block 408, the fin fan motor is moved to the carriage 140 of the motor lifting device 100. For example, in embodiments, the shaft of the motor may be positioned at least partially in the one or more slots 142 of the carriage plate 148. With the motor positioned on the carriage plate 148, the motor may be connected to the holding frame 152 by chains or the like, thereby securing the motor to the motor lifting device 100. With the motor secured to the carriage 140, the carriage 140 may be lowered in the vertical direction (i.e., in the −z-direction as depicted) by moving the carriage 140 downward along the vertical guide column 130. The motor lifting device 100 may then be used to move the motor, for example so that the motor can be serviced or replaced.

In embodiments, a reverse method may be utilized to install a motor to a heat exchanger. For example, a motor may be positioned on the carriage 140 of the motor lifting device 100, and the motor lifting device 100 may be utilized to move the motor beneath a motor mount of the heat exchanger. The carriage 140 may then be raised in the vertical direction (i.e., in the +z-direction) along the vertical guide column 130 to position the motor within the motor mount of the heat exchanger.

In this way, the motor lifting device 100 may replace conventional hoists and/or cranes in the removal and installation of motors to heat exchangers, such as fin fan heat exchangers. By utilizing motor lifting devices 100 according to the present disclosure, the time required to remove and/or install motors to heat exchangers can be reduced as compared to methods including tradition hoists and/or cranes. In particular, traditional hoists and cranes, as may be required to move fin fan motors, may be large and cumbersome. As such, it may be difficult or impossible to maneuver the cranes and hoists directly beneath a motor in a fin fan heat exchanger. Instead, it may be necessary to control the position of the motor through slings and the like, thereby increasing the time and manpower required to install or remove a motor and may require users to remove guards and/or work in confined spaces. For example, some conventional installation methods may require eight hours to remove or install a fin fan motor. By contrast, motor lifting devices 100 according to the present disclosure may be positioned directly beneath a motor or motor mount, thereby reducing the time and manpower required to install or remove a motor from a heat exchanger. Moreover, by utilizing motor lifting devices 100 according to the present disclosure, hoists and cranes are not needed to be within areas of heat exchangers that may have pressurized gas, thereby reducing the likelihood of the hoists and/or cranes of striking components holding pressurized gas.

Further, by moving the motor via the carriage 140 of the motor lifting device 100, it is not necessary for technicians to be positioned directly beneath the motor during the installation or removal process.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the appended claims should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modifications and variations come within the scope of the appended claims and their equivalents.

It is noted that recitations herein of a component of the present disclosure being "structurally configured" in a particular way, to embody a particular property, or to function in a particular manner, are structural recitations, as opposed to recitations of intended use. More specifically, the references herein to the manner in which a component is "structurally configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method for removing a fin fan motor from a heat exchanger, the method comprising:

positioning a motor lifting device beneath the fin fan motor;

moving a carriage of the motor lifting device upward in a vertical direction with respect to a base member of the motor lifting device along a vertical guide column;

moving one or more vertical support members into a locked position, the one or more vertical support members spaced apart from the vertical guide column and extending between the carriage and the base member, wherein the one or more vertical support members restrict vertical movement of the carriage with respect to the base member in the locked position; and moving the fin fan motor to the carriage of the motor lifting device.

2. The method of claim 1, wherein moving the one or more vertical support members into the locked position comprises moving a first vertical support member engaged with a first side of the carriage into the locked position, and moving a second vertical support member engaged with a second side of the carriage into the locked position.

3. The method of claim 2, wherein the first side is positioned opposite the second side.

4. The method of claim 1, wherein moving the fin fan motor to the carriage of the motor lifting device comprises positioning a shaft of the fin fan motor at least partially within a slot defined by the carriage.

5. The method of claim 1, further comprising moving the carriage of the motor lifting device in a direction transverse to the vertical direction with respect to the vertical guide column with one or more transverse actuators coupled to the carriage.

6. The method of claim 1, further comprising engaging a surface with one or more outrigger members coupled to the base member.

7. The method of claim 1, further comprising connecting the fin fan motor to a holding frame extending upward from the carriage.

* * * * *